United States Patent
Klausberger et al.

(10) Patent No.: US 7,280,741 B2
(45) Date of Patent: Oct. 9, 2007

(54) METHOD AND APPARATUS FOR CONTROLLING THE INSERTION OF STUFFING DATA INTO A BITSTREAM TO BE RECORDED

(75) Inventors: Wolfgang Klausberger, Hannover (DE); Dirk Adolph, Ronnenberg (DE); Hui Li, Hannover (DE); Ralf Ostermann, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 887 days.

(21) Appl. No.: 10/474,477

(22) PCT Filed: Jan. 23, 2002

(86) PCT No.: PCT/EP02/00645

§ 371 (c)(1),
(2), (4) Date: Oct. 9, 2003

(87) PCT Pub. No.: WO02/085010

PCT Pub. Date: Oct. 24, 2002

(65) Prior Publication Data

US 2004/0114540 A1 Jun. 17, 2004

(30) Foreign Application Priority Data

Apr. 11, 2001 (EP) .................................. 01250129

(51) Int. Cl.
*H04N 5/91* (2006.01)
*H04N 7/00* (2006.01)

(52) U.S. Cl. .............................. 386/95; 386/98; 386/46; 386/83

(58) Field of Classification Search .................. 386/98, 386/46, 95, 83
See application file for complete search history.

(56) References Cited

U.S. PATENT DOCUMENTS

| 6,108,486 | A   | * | 8/2000  | Sawabe et al. ............... 386/98 |
| 6,320,825 | B1  | * | 11/2001 | Bruekers et al. .......... 369/30.17 |
| 6,553,086 | B1  | * | 4/2003  | Yoo et al. .................... 375/354 |
| 7,079,753 | B2  | * | 7/2006  | Ando et al. .................. 386/95 |
| 2004/0101273 | A1 | * | 5/2004 | Winter et al. ................ 386/46 |

FOREIGN PATENT DOCUMENTS

| EP | 986062   | 3/2000 |
| EP | 1021048  | 7/2000 |
| WO | 01/54126 | 7/2001 |

OTHER PUBLICATIONS

Search report dated Jul. 17, 2002.

* cited by examiner

*Primary Examiner*—Amare Mengistu
*Assistant Examiner*—Anner Holder
(74) *Attorney, Agent, or Firm*—Joseph J. Laks; Robert D. Shedd; Paul P. Kiel

(57) ABSTRACT

In DVD Stream Recording Stream Object Units are real-time recorded, wherein such fixed-length Stream Object Units serve as a container for Application Packets that have a variable length and carry payload data and an Application Time Stamp, this timestamp enabling proper real-time playback. In case the temporal distance between two succeeding application packets is too big, stuffing data must be inserted into the corresponding Stream Object Units. The real-time stuffing control is performed such that overflow of the input buffer is avoided in case of a specific kind of input signals.

10 Claims, 2 Drawing Sheets

Figure 1:
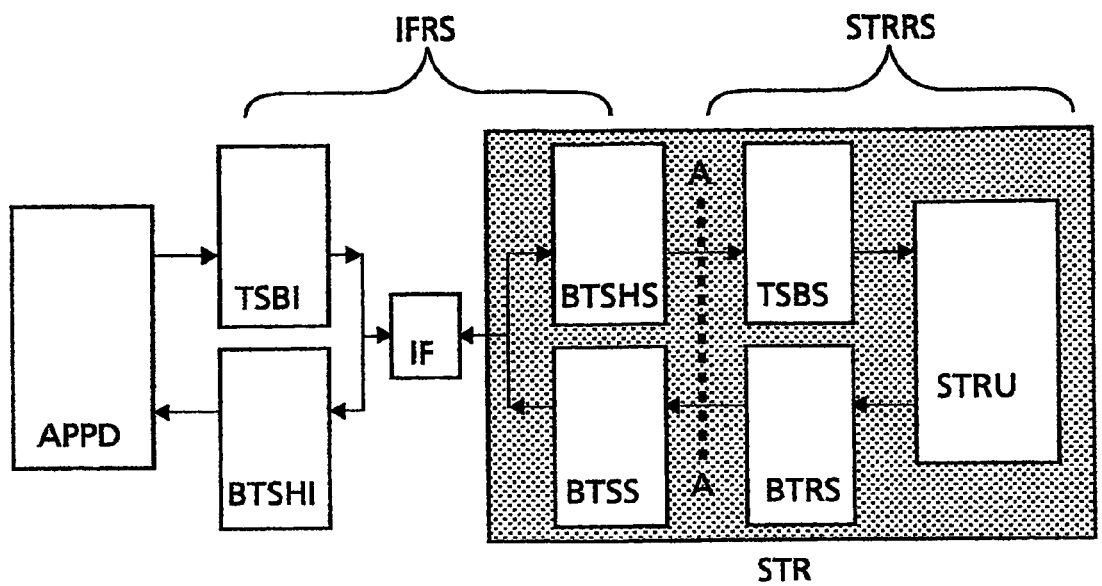

METHOD AND APPARATUS FOR CONTROLLING THE INSERTION OF STUFFING DATA INTO A BITSTREAM TO BE RECORDED

This application claims the benefit, under 35 U.S.C. § 365 of International Application PCT/EP02/00645, filed Jan. 23, 2002, which was published in accordance with PCT Article 21(2) on Oct. 24, 2002 in English and which claims the benefit of European patent application No. 01250129.2, filed Apr. 11, 2001.

The invention relates to a method and to an apparatus for controlling the insertion of stuffing data into a bitstream to be recorded in real-time.

BACKGROUND

The DVD Stream Recording standard "DVD Specifications for Rewritable/Re-recordable Discs, Part 5, Stream Recording, May 2000", defines Stream Object Units (SOBU) of 64 kB length each as a container for Application Packets (AP_PKT) that normally have a variable number of bits or bytes and that carry payload data. Each AP_PKT carries its own time information in a 4-byte-Application Time Stamp (ATS) that is based on a 27.000 MHz clock, this timestamp enabling proper real-time playback.

For navigation purposes a Mapping List (MAPL) is generated in the information file for each Stream Object (SOB). Such mapping list is described in more detail in WO-A-00/14743 of the applicant and in clause 4.2.3.3.2 of above standard. Each first complete AP_PKr of a SOBU generates a mapping list entry for the Incremental Application Packet Arrival Time (IAPAT), as defined and calculated in above clause 4.2.3.3.2. The IAPAT values represent time durations. The time distance of subsequent SOBUs is to be less than 23.3 seconds because of the limited 12 bit-resolution of the IAPAT values. To fulfil this requirement, stuffing packets are to be inserted in corresponding SOBUs of a SOB in case of low bit-rate signals, i.e. for bit rates less than 22.181 kbit/s, see Annex J of above standard.

INVENTION

One feasibility for deciding about the insertion of stuffing data or stuffing packets is to wait for the next AP_PKT and to calculate the time duration between it and the first AP_PKT in the current SOBU. However, if for example a low bit rate signal input stream consisting of a long period with still pictures is followed by high data rate picture signals, that procedure could lead to input buffer overflow because the involved processor will be busy with stuffing handling before beginning processing of the high data rate picture signal input data.

A problem to be solved by the invention is to control the insertion of stuffing data into data packets of a bitstream to be recorded, such that input buffer overflow is prevented and as an additional advantage a smaller capacity of the input buffer is sufficient. This problem is solved by the method disclosed in claim 1 or 2. An apparatus that utilises this method is disclosed in claim 6 or 7.

In a first embodiment of the invention, the stuffing condition will be checked not only by the time control of subsequent incoming Application Packets AP_PKT but also by using time information derived from the cycle start packet generated by the 'cycle master' in an IEEE 1394 network, i.e. by the IEEE 1394 cycle synch interrupt pulses. Via that IEEE 1394 connection and an IEEE 1394 interface the DVD Streamer device receives data to be recorded or sends replayed data, respectively.

As an alternative, a separate timer can be utilised instead of the IEEE 1394 cycle synch interrupt pulses.

In a second embodiment of the invention, the stuffing condition will be checked only by the IEEE 1394 cycle synch interrupt pulses.

Thereby advantageously real-time control of stuffing insertion can be guaranteed, and input buffer overflow is avoided. A reduction of the capacity of the DVD streamer input bit-buffer can be achieved. In principle, the inventive method is suited for controlling the insertion of stuffing data into a bitstream to be recorded, wherein the data to be recorded are structured into first-format data packets that can have a variable length and to which time stamps are assigned, which first-format data packets are assigned to second-format data packets having a constant length, including the steps:

determining the time of the time stamp of a first first-format data packet received for the recording of a current second-format data packet;

checking whether a predetermined time limit has elapsed between the time of said time stamp of said first first-format data packet and a time instant derived from an essentially periodic signal that is derived from the IEEE 1394 cycle synch interrupt pulse of an IEEE 1394 interface via which said bitstream to be recorded is received, wherein said predetermined time limit is related to said constant second-format data packet length;

if said predetermined time limit has elapsed and said current second-format data packet is not yet appropriately filled with said first first-format data packet or additional subsequently received first-format data packets or at least a time stamp of one following first-format data packet, inserting stuffing data into the current second-format data packet, or for controlling the insertion of stuffing data into a bitstream to be recorded, wherein the data to be recorded are structured into first-format data packets that can have a variable length and to which time stamps are assigned, which first-format data packets are assigned to second-format data packets having a constant length, including the steps:

determining the time of the time stamp of a first first-format data packet received for the recording of a current second-format data packet;

checking whether a first time limit has elapsed between the time of the time stamp of the latest received first-format data packet for the current second-format data packet and the time of the time stamp of a following first-format data packet expected to be received for the recording, wherein said first time limit is derived from—in particular the temporal difference between—said constant second-format data packet length and the time of the time stamp, or the location, of said latest received first-format data packet;

if said first time limit has elapsed without said following first-format data packet expected to be received for the recording having actually been received, checking whether a predetermined second time limit has elapsed between the time of said time stamp of said first first-format data packet and a time instant derived from an essentially periodic signal, wherein said second time limit is related to said constant second-format data packet length, or checking whether a second time limit has elapsed between the time of the time stamp of said latest received first-format data packet and a time derived from an essentially periodic signal, wherein said second time limit is derived from—in particular the temporal difference between—said constant second-format data packet length and the time of the time stamp, or the location, of said latest received first-format data packet;

if said second predetermined time limit or said second time limit, respectively, has elapsed, too, and said current second-format data packet is not yet appropriately filled with said first first-format data packet or additional subsequently received first-format data packets or at least a time stamp of one following first-format data packet, inserting stuffing data into the current second-format data packet.

In principle the inventive apparatus is suited for controlling the insertion of stuffing data into a bitstream to be recorded, wherein the data to be recorded are structured into first-format data packets that can have a variable length and to which time stamps are assigned, which first-format data packets are assigned to second-format data packets having a constant length, and includes:

means for determining the time of the time stamp of a first first-format data packet-received for the recording of a current second-format data packet;

means for checking whether a predetermined time limit has elapsed between the time of said time stamp of said first first-format data packet and a time instant derived from an essentially periodic signal that is derived from the IEEE 1394 cycle synch interrupt pulse of an IEEE 1394 interface via which said bitstream to be recorded is received, wherein said predetermined time limit is related to said constant second-format data packet length;

means for inserting stuffing data into the current second-format data packet, if said predetermined time limit has elapsed and said current second-format data packet is not yet appropriately filled with said first first-format data packet or additional subsequently received first-format data packets or at least a time stamp of one following first-format data packet, or includes:

means for determining the time of the time stamp of a first first-format data packet received for the recording of a current second-format data packet;

means for checking whether a first time limit has elapsed between the time of the time stamp of the latest received first-format data packet for the current second-format data packet and the time of the time stamp of a following first-format data packet expected to be received for the recording, wherein said first time limit is derived from—in particular the temporal difference between—said constant second-format data packet length and the time of the time stamp, or the location, of said latest received first-format data packet;

means for checking whether a predetermined second time limit has elapsed between the time of said time stamp of said first first-format data packet and a time instant derived from an essentially periodic signal, wherein said second time limit is related to said-constant second-format data packet length, or means for checking whether a second time limit has elapsed between the time of the time stamp of said latest received first-format data packet and a time derived from an essentially periodic signal, wherein said second time limit is derived from—in particular the temporal difference between—said constant second-format data packet length and the time of the time stamp, or the location, of said latest received first-format data packet, if said first time limit has elapsed without said following first-format data packet expected to be received for the recording having actually been received;

means for inserting stuffing data into the current second-format data packet, if said second predetermined time limit or said second time limit, respectively, has elapsed, too, and said current second-format data packet is not yet appropriately filled with said first first-format data packet or additional subsequently received first-format data packets or at least a time stamp of one following first-format data packet.

Advantageous additional embodiments of the invention are disclosed in the respective dependent claims.

DRAWINGS

Figure 2:
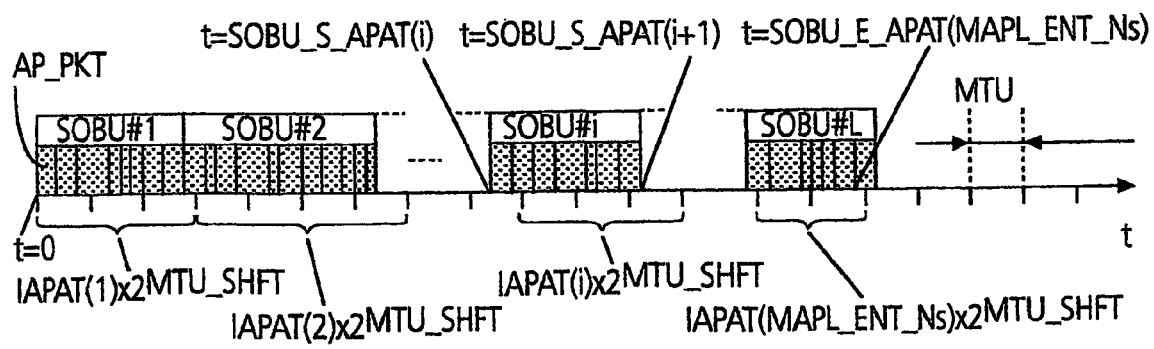
Figure 3:
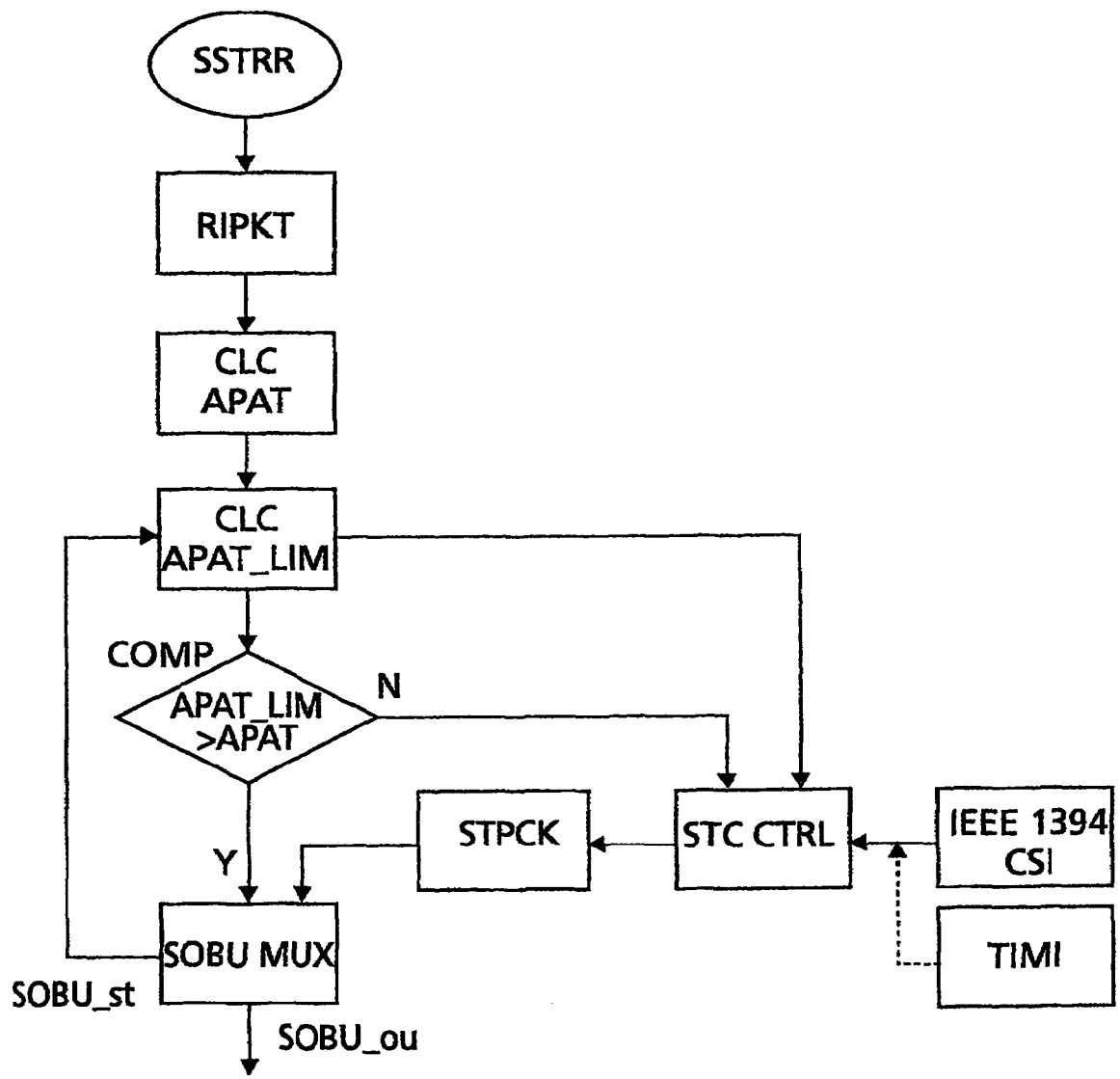

Exemplary embodiments of the invention are described with reference to the accompanying drawings, which show in:

FIG. 1 simplified system model for DVD stream recording;

FIG. 2 SOBUs arranged along an IAPAT time axis;

FIG. 3 flow chart for real-time stuffing control.

EXEMPLARY EMBODIMENTS

In FIG. 1 an application device APPD is connected to a DVD streamer unit STRU via an interface IF. APPD can be a settop box or a digital TV and/or audio receiver or a CD or DVD player or a computer outputting video and/or audio signals that for instance have been downloaded from the Internet. To APPD belongs interface circuitry: a timestamping & buffering stage TSBI that generates timestamps and buffers data packets coming from APPD before passing them to IF, and a buffering & timestamping handling stage BTSHI receiving data packets from IF and handling the intermediate buffering and temporally correct delivering of the data packets to APPD. In real-time record mode a connected DVD streamer STR receives e.g. MPEG-2 transport packets for one or more programs via the IEEE 1394 interface IF. These packets pass through a further buffering & timestamp handling stage BTSHS and a further timestamping & buffering stage TSBS to a streamer unit STRU. Replayed data packets coming from STRU pass through a buffering & timing regeneration stage BTRS and a further buffering & timestamping handling stage BTSS to IF.

Dashed line A-A is the functional border between the streamer-related STRRS stages/unit TSBS, BTRS and STRU, and the interface-related IFRS stages/unit TSBI, BTSHS, BTSS, BTSHI and IF.

To the DVD streamer STR, which is depicted as a shadowed box, belong unit/stages STRU, BTSHS, TSBS, BTRS and BTSS.

The timestamp format according to IEEE 1394 is based on a 24.576 MHz clock and includes two wraparound counters. The first counter output is a 12-bit cycle_offset counting from '0' to '3071' and the second counter output is a 13-bit cycle_count counting from '0' to '7999'. By passing the upper boundary limit of the counters, a wraparound to zero is executed. The wraparound of the first counter cycle_offset carries into the second cycle_count field. A complete time period causing one wraparound for cycle_count has a length of 1 second.

For real-time data packet handling in a DVD streamer, each DVD transport packet has to carry its own timestamp having a word length of e.g. 4 bytes. Normally, the DVD streamer generates and records its own timestamps together with the recorded data packets. Such DVD streamer timestamps are thereafter used in the replaying mode to output the recorded data packets according to the original temporal location at recording time.

Because STR includes an IEEE 1394 interface, the IEEE 1394 timestamps are already present within the DVD streamer, although their format does not match above ATS time stamp format, in particular due to the different clock frequencies 24.576 MHz and 27.000 MHz, respectively.

As mentioned above, inside a DVD Stream Recorder the Application Packets AP_PKT are packed into 64 kB-Stream-Object Units SOBU. The time duration related to each SOBU is carried in the Mapping List MAPL available in the DVD Stream Recording navigation data. The mapping time conditions are illustrated in FIG. 2, wherein one Mapping Time Unit MTU corresponds to IAPAT=1 and $(2(MTU\_SHFT-9)/9000)$ seconds E.g. for MTU_SHFT=18 the Mapping Time Unit equals a time period of approx. 5.69 ms.

SOBU_S_APAT is a start application packet arrival time and SOBU_E_APAT is an end application packet arrival time. MAPL_ENT_Ns is the number of mapping list entries.

During the creation of SOBUs the insertion of stuffing packets (and sometimes complete stuffing SOBUs) becomes necessary after a predefined time limit between the ATS of the first received AP_PKT of a current SOBU and the ATS of the currently received AP_PKT, which could be packed into the same SOBU, has been exceeded. The stuffing data are preferably inserted into the remainder of the current SOBU. The value of that predefined time limit is derived from the time period corresponding to the length of a SOBU, i.e. 23.3s. In the above mentioned scenario of a low bit-rate signal input stream consisting of a long period of still picture followed by high data rate signals, waiting until the end of the still picture period and creating stuffing packets afterwards could lead to an overflow of the input buffer in stage TSBS at the begin of a following high data rate sequence. This leads to the conclusion that stuffing packet creation has to be done in real-time.

The flowchart of FIG. 3 illustrates a procedure fulfilling that requirement, beginning with box 'start stream recording' SSTRR. An input application packet is received in step RIPKT, and the corresponding application packet arrival time is calculated or evaluated in step CLC APAT, whereby the 4-byte Application Packet Time Stamps ATS of the input packets AP_PKT are converted into 6-byte APATs (Application Packet Arrival Time). This conversion calculation can be performed as described in application EP 00250307.6 of the applicant. Whenever a SOBU starts—denoted SOBU_st—the time limit APAT_LIM for the packet organisation inside one SOBU will be calculated in step CLC APAT_LIM by adding corresponding APAT values to form a resulting sum value $SUM\_IAPAT(k-1)+(2^{12}-2)$. APAT_LIM has e.g. the above-mentioned value of approximately 23.3s between two subsequent SOBUs. The value 23.3s corresponds to $(2^{12}-2)* 5.69$ ms, wherein 5.69 ms is the above mentioned MTU. SUM_IAPAT can be regarded as a running time value. SUM_IAPAT(k−1) is such time value valid for the previous SOBU. The maximum time value SUM IAPAT(k) allowed for the current SOBU must therefore not exceed SUM_IAPAT(k−1)+23.3s.

If in comparison step COMP the APAT of an incoming application packet AP_PKT almost reaches or reaches or exceeds APAT_LIM, the stuffing condition control is basically checked in a step STCCTRL. If the stuffing condition is fulfilled, stuffing packets are created in step STPCK and inserted into the current SOBU. The current SOBU is arranged in a step SOBU MUX in the correct recording order and is output—SOBU_ou.

Without an additional time reference this decision can normally be made using subsequent incoming AP_PKTs only. However, on some occasions, e.g. in case of a long period of still pictures or audio signals requiring a small amount of coding data only, incoming AP_PKTs and their timestamps ATS are missing at the desirable time instant when they would be required for making a decision on stuffing packet insertion. For such periods with absence of incoming AP_PKTs and therefore ATSs the stuffing condition control can be performed using time information from the IEEE 1394 cycle synch interrupt that occurs every 125 μs, and that can be derived from the cycle start packet generated by the 'cycle master' in an IEEE 1394 network. Advantageously these cycle synch interrupt pulses are available in step IEEE1394 CSI within the streamer device because STR includes an IEEE 1394 interface, i.e. these pulses are available in stage BTSHS. This stuffing condition includes checking whether a further predetermined time limit has elapsed between the time timestamp corresponding to SOBU_st and a time derived from the periodic IEEE 1394 cycle synch interrupt pulse. This further time limit and the time limit APAT_LIM can be equal. Both are related to the length of a SOBU. It is also possible to consider the time elapsed between the latest ATS of the current SOBU the further time limit. The checking for a current SOBU based on the cycle synch interrupt pulse can start together with above basic check, or can start at any later time ins stant towards the end of the current SOBU or shortly after the begin of the next SOBU.

An alternative solution is to use, instead of the cycle synch interrupt pulse, corresponding periodic pulses or a periodic signal TIMI coming from an additional internal or an external timer or generator or source.

In another embodiment, only the checking based on the cycle synch interrupt pulses is carried out, i.e. beginning with the ATS corresponding to SOBU_st only the time period measurement based on the cycle synch interrupt pulses is carried out and is compared with a single time limit APAT_LIM. If no further ATS is available for a current SOBU that is not yet filled with one or more application packets, the stuffing data insertion for that SOBU is carried out.

The inventive procedure guarantees real-time control for the stuffing byte or stuffing packet insertion and avoids input buffer overflow in case of particular streamer input signals. Because no corresponding buffer overflow can occur in an input bit-buffer the capacity of which is designed for the processing of 'normally' received input data, the capacity of the input bit-buffer needs no reserve capacity and can therefore be chosen smaller.

The invention claimed is:

1. Method for controlling the insertion of stuffing data into a bitstream to be recorded, wherein the data to be recorded are structured into first-format data packets that can have a variable length and to which time stamps are assigned, which first-format data packets are assigned to and packed into second-format data packets having a constant length, comprising the steps:

determining the time of the time stamp of a first-format data packet received for the recording of a current second-format data packet;

checking whether a predetermined time limit has elapsed between the time of said time stamp of said first first-format data packet and a time instant derived from an essentially periodic signal that is derived from the IEEE 1394 cycle synch interrupt pulse of an IEEE 1394 interface via which said bitstream to be recorded is received, wherein said predetermined time limit is related to said constant second-format data packet length;

if said predetermined time limit has elapsed and said current second-format data packet is not yet appropriately filled with said first first-format data packet or additional subsequently received first-format data packets or at least a time stamp of one following first-format data packet, inserting stuffing data into the remainder of the current second-format data packet.

2. Method for controlling the insertion of stuffing data into a bitstream to be recorded, wherein the data to be recorded are structured into first-format data packets that can have a variable length and to which time stamps are assigned, which first-format data packets are assigned to and packed into second-format data packets having a constant length, comprising the steps:

determining the time of the time stamp of a first first-format data packet received for the recording of a current second-format data packet;

checking whether a first time limit has elapsed between the time of the time stamp of the latest received first-format data packet for the current second-format data packet and the time of the time stamp of a following first-format data packet expected to be received for the recording, wherein said first time limit is derived from—in particular the temporal difference between—said constant second-format data packet length and the time of the time stamp, or the location, of said latest received first-format data packet;

if said first time limit has elapsed without said following first-format data packet expected to be received for the recording having actually been received, checking a predetermined second time limit has elapsed between the time of said time stamp of said first first-format data packet and a time instant derived from an essentially periodic signal, wherein said second time limit is related to said constant second-format data packet length, or checking whether a second time limit has elapsed between the time of the time stamp of said latest received first-format data packet and a time derived from an essentially periodic signal, wherein said second time limit is derived from—in particular the temporal difference between—said constant second-format data packet length and the time of the time stamp, or the location, of said latest received first-format data packet;

if said second predetermined time limit or said second time limit, respectively, has elapsed, too, and said current second-format data packet is not yet appropriately filled with said first first-format data packet or additional subsequently received first-format data packets or at least a time stamp of one following first-format data packet, inserting stuffing data into the remainder of the current second-format data packet.

3. Method according to claim 2, wherein said essentially periodic signal is derived from the IEEE 1394 cycle synch interrupt pulse of an IEEE 1394 interface via which said bitstream to be recorded is received.

4. Method according to claim 2, wherein said essentially periodic signal is derived from an internal or external timer.

5. Method according to claim 1, wherein the time of said time stamps is the arrival time of said first-format data packets.

6. Apparatus for controlling the insertion of stuffing data into a bitstream to be recorded, wherein the data to be recorded are structured into first-format data packets that can have a variable length and to which time stamps are assigned, which first-format data packets are assigned to and packed into second-format data packets having a constant length, said apparatus including:

means for determining the time of the time stamp of a first first-format data packet received for the recording of a current second-format data packet;

means for checking whether a predetermined time limit has elapsed between the time of said time stamp of said first first-format data packet and a time instant derived from an essentially periodic signal that is derived from the IEEE 1394 cycle synch interrupt pulse of an IEEE 1394 interface via which said bitstream to be recorded is received, wherein said predetermined time limit is related to said constant second-format data packet length;

means inserting stuffing data the remainder of the current second-format data packet, if said predetermined time limit has elapsed and said current second-format data packet is not yet appropriately filled with said first first-format data packet or additional subsequently received first-format data packets or at least a time stamp of one following first-format data packet.

7. Apparatus for controlling the insertion of stuffing data into a bitstream to be recorded, wherein the data to be recorded are structured into first-format data packets that can have a variable length and to which time stamps are assigned, which first-format data packets are assigned to and packed into second-format data packets having a constant length, said apparatus including:

means for determining the time of the time stamp of a first first-format data packet received for the recording of a current second-format data packet;

means for checking whether a first time limit has elapsed between the time of the time stamp of the latest received first-format data packet for the current second-format data packet and the time of the time stamp of a following first-format data packet expected to be received for the recording, wherein said first time limit is derived from—in particular the temporal difference between—said constant second-format data packet length and the time of the time stamp, or the location, of said latest received first-format data packet;

means for checking whether a predetermined second time limit has elapsed between the time of said time stamp of said first first-format data packet and a time instant derived from an essentially periodic signal, wherein said second time limit is related to said constant second-format data packet length, or means for checking whether a second time limit has elapsed between the time of the time stamp of said latest received first-format data packet and a time derived from an essentially periodic signal, wherein said second time limit is derived from—in particular the temporal difference between—said constant second-format data packet length and the time of the time stamp, or the location, of said latest received first-format data packet, if said first time limit has elapsed without said following first-format data packet expected to be received for the recording having actually been received;

means for inserting stuffing data into the remainder of the current second-format data packet, if said second predetermined time limit or said second time limit, respectively, has elapsed, too, and said current second-format data packet is not yet appropriately filled with said first first-format data packet or additional subsequently received first-format data packets or at least a time stamp of one following first-format data packet.

8. Apparatus according to claim 7, wherein said essentially periodic signal is derived from the IEEE 1394 cycle synch interrupt pulse of an IEEE 1394 interface via which said bitstream to be recorded is received.

9. Apparatus according to claim 7, wherein said essentially periodic signal is derived from an internal or external timer.

10. Apparatus according to claim 6, wherein the time of said time stamps is the arrival time of said first-format data packets.

* * * * *